US012798540B2

(12) United States Patent
Zhang

(10) Patent No.: US 12,798,540 B2
(45) Date of Patent: Nov. 17, 2026

(54) ELECTROMECHANICAL BRAKE AND ITS LOCKING DEVICE AND LOCKING DEVICE CONTROL METHOD

(71) Applicant: Robert Bosch GmbH, Stuttgart (DE)

(72) Inventor: Xiaokun Zhang, Suzhou (CN)

(73) Assignee: Robert Bosch GmbH, Stuttgart (DE)

(*) Notice: Subject to any disclaimer, the term of this patent is extended or adjusted under 35 U.S.C. 154(b) by 633 days.

(21) Appl. No.: 18/353,396

(22) Filed: Jul. 17, 2023

(65) Prior Publication Data

US 2024/0025389 A1 Jan. 25, 2024

(30) Foreign Application Priority Data

Jul. 20, 2022 (CN) ........................ 202210853879.9

(51) Int. Cl.

*B60T 13/74* (2006.01)
*B60T 1/00* (2006.01)
*B60T 8/17* (2006.01)
*B60T 17/22* (2006.01)
*F16D 65/18* (2006.01)

(Continued)

(52) U.S. Cl.

CPC ............ *B60T 13/746* (2013.01); *B60T 1/005* (2013.01); *B60T 8/17* (2013.01); *B60T 17/22* (2013.01); *F16D 65/18* (2013.01); *F16D 66/00* (2013.01); *F16D 2066/003* (2013.01); *F16D 2121/20* (2013.01); *F16D 2121/24* (2013.01); *F16D 2125/50* (2013.01); *F16D 2127/02* (2013.01); *F16D 2127/06* (2013.01)

(58) Field of Classification Search

None

See application file for complete search history.

(56) References Cited

U.S. PATENT DOCUMENTS 7,316,300 B2 * 1/2008 Danne ..................... F16D 55/00 188/162
2005/0217952 A1 * 10/2005 Usui ....................... F16D 65/18 188/162
2021/0239211 A1 * 8/2021 Stöhr .................... F16D 63/006

FOREIGN PATENT DOCUMENTS

DE 102020213916 A1 * 8/2021 ........... F16D 55/226
WO WO-2021091112 A1 * 5/2021 ............. F16D 65/14

OTHER PUBLICATIONS

DE-102020213916-A1: English Machine Translation (Year: 2021).*
WO-2021091112-A1: English Machine Translation (Year: 2021).*

* cited by examiner

*Primary Examiner* — Melanie Torres Williams

(74) *Attorney, Agent, or Firm* — Maginot, Moore & Beck LLP

(57) ABSTRACT

An electromechanical brake and its locking device and locking device control method is disclosed. The locking device comprises: a ratchet gear and a ratchet wheel fixedly coupled in a coaxial manner; a pivotable pawl component capable of pivotal movement between a working position interlocked with the ratchet wheel and an idle position detached from the ratchet wheel, the pawl component restricting the rotation of the ratchet wheel in a first direction and the rotation of the ratchet wheel in a second direction releases the pawl component when the pawl component and the ratchet wheel are interlocked; a spring member coupled to the pawl component for pivoting the pawl component toward the idle position; and an electromagnetic actuator that acts on the pawl component when operating at a first polarity to cause the pawl component to pivot from the idle position to the working position against the elastic force of the spring member.

14 Claims, 12 Drawing Sheets

(51) Int. Cl.

| | |
|---|---|
| ***F16D 66/00*** | (2006.01) |
| *F16D 121/20* | (2012.01) |
| *F16D 121/24* | (2012.01) |
| *F16D 125/50* | (2012.01) |
| *F16D 127/02* | (2012.01) |
| *F16D 127/06* | (2012.01) |

ELECTROMECHANICAL BRAKE AND ITS LOCKING DEVICE AND LOCKING DEVICE CONTROL METHOD

This application claims priority under 35 U.S.C. § 119 to application no. CN 2022 1085 3879.9, filed on Jul. 20, 2022 in China, the disclosure of which is incorporated herein by reference in its entirety.

The present disclosure relates to the field of vehicle braking devices, and more particularly, to a locking device for an electromechanical brake, a locking device control method, and an electromechanical brake.

BACKGROUND

An electromechanical brake is a device that realizes braking by driving a brake caliper via a motor. Compared with a conventional hydraulic pipeline brake, an electromechanical brake is characterized by fast response, simple structure, and easy maintenance. With the electrified and intelligent development of vehicles, electromechanical brakes are becoming popular braking systems due to easier integration with electric control systems.

In a conventional hydraulic braking system, the hydraulic pressure in the brake cylinder is maintained by a handbrake or a footbrake, thereby achieving the parking brake. In contrast, in order to achieve the parking brake function, an electromechanical brake is often equipped with parking locking devices, for example, using a pin driven by an electromagnetic actuator to interfere with the transmission mechanism for locking the brake. However, such systems need to keep the electromagnetic actuator energized when the vehicle is parked, and the parking brake may fail when the electromagnetic actuator fails.

SUMMARY

The present disclosure aims to solve, or at least alleviate, problems existing in the prior art.

In one aspect, a locking device for an electromechanical brake is provided, comprising: a ratchet gear and a ratchet wheel fixedly coupled in a coaxial manner; a pivotable pawl component capable of pivotal movement between a working position interlocked with the ratchet wheel and an idle position detached from the ratchet wheel, the pawl component restricting rotation of the ratchet wheel in a first direction and the rotation of the ratchet wheel in a second direction will release the pawl component when the pawl component and the ratchet wheel are interlocked; a spring member coupled to the pawl component to tend to rotate the pawl component toward the idle position; and an electromagnetic actuator that acts on the pawl component when operating at a first polarity to cause the pawl component to rotate from the idle position to the working position against the elastic force of the spring member.

In another aspect, an electromechanical brake is provided, comprising: a brake motor; a transmission device connected with the brake motor; a locking device according to each example of the present disclosure, wherein the ratchet gear of the locking device is engaged with a transmission gear of the transmission device; and a brake actuator coupled to the transmission device to receive a brake torque and perform a brake operation.

In another aspect, a control method for the locking device is provided, comprising: controlling the brake motor to rotate forwardly to establish a predetermined braking torque when the parking brake signal is received; controlling the electromagnetic actuator to act on the pawl component to pivot the pawl component from the idle position separated from the ratchet wheel to the working position; and controlling the reverse rotation of the brake motor to cause the pawl component to move to the working position to interlock with the ratchet wheel; and to deactivate the electromagnetic actuator and the brake motor.

The devices and method according to the examples of the present disclosure realize parking braking of an electromechanical brake by a ratchet pawl mechanism without the need for the electromagnetic actuator to remain in operation for a long time, but only for a short period of time when the operating state is changed.

BRIEF DESCRIPTION OF THE DRAWINGS

Referring to the appended drawings, the present disclosure will become more readily understood. It should be readily understood by those skilled in the art that the drawings are for illustrative purposes only and are not intended to constitute a limitation on the scope of the present disclosure. In addition, similar numerals in the drawings are used to denote similar components, wherein.

DETAILED DESCRIPTION

Figure 1:
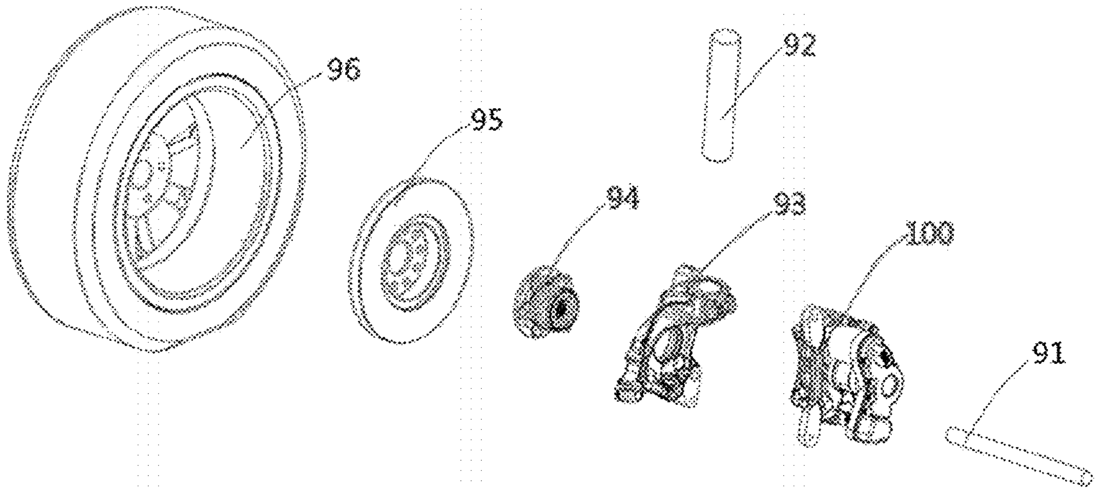
FIG. 1 is an exploded view of the electromechanical brake assembled to a wheel hub according to the examples of the present disclosure.
Figure 2:
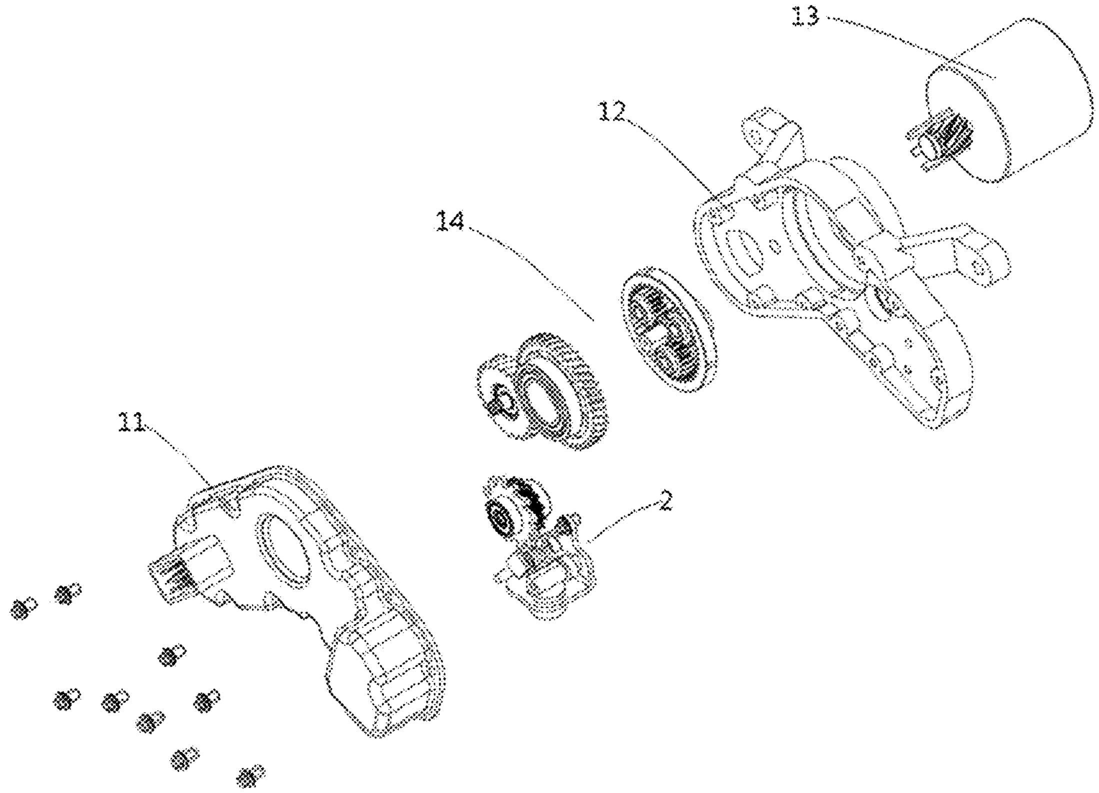
FIG. 2 is an exploded view of a portion of the electromechanical brake other than a brake actuator according to the examples of the present disclosure.

FIG. 1 shows an installation diagram of an electromechanical brake showing a rotating shaft 91, a shock absorber 92, a bearing 94, a knuckle arm 93, a brake disc 95, and a wheel 96, as well as an electromechanical brake 100 according to the example of the present disclosures, the electromechanical brake being driven by a motor to provide braking force by clamping the brake disc 95 with a brake caliper. The electromechanical brake 100 is mounted on the knuckle arm 93 during assembly, and the electromechanical brake 100 is further housed in a compact space inside the hub of the wheel 96.

Figure 3:
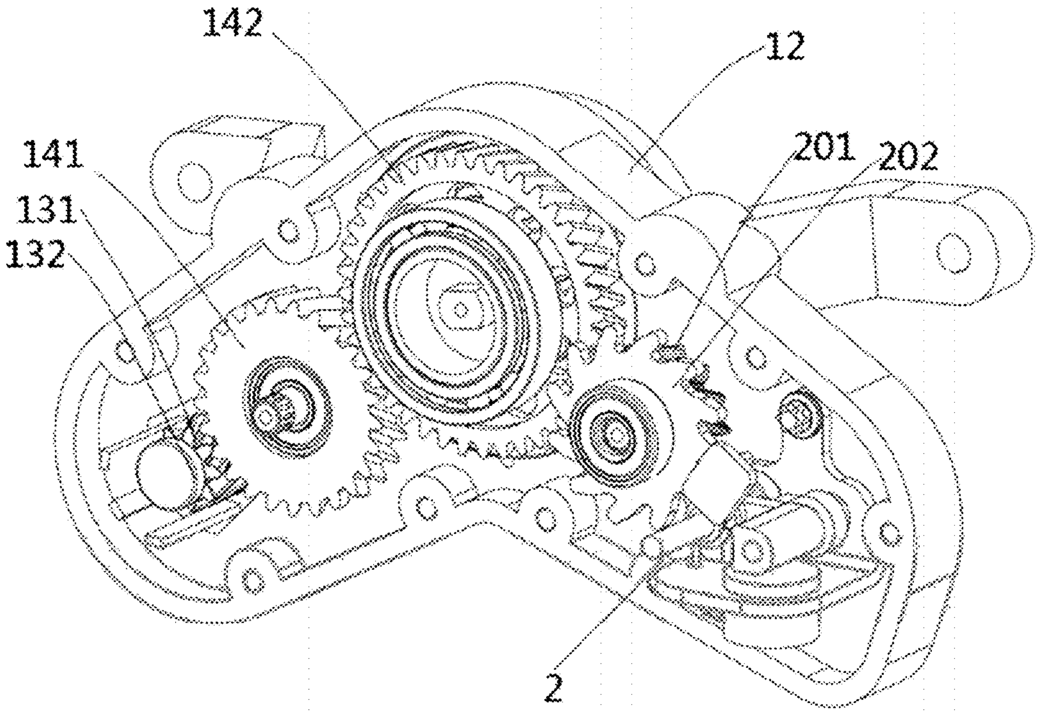
FIG. 3 is an assembly view of the locking device and the transmission device of the electromechanical brake according to the examples of the present disclosure.
Figure 4:
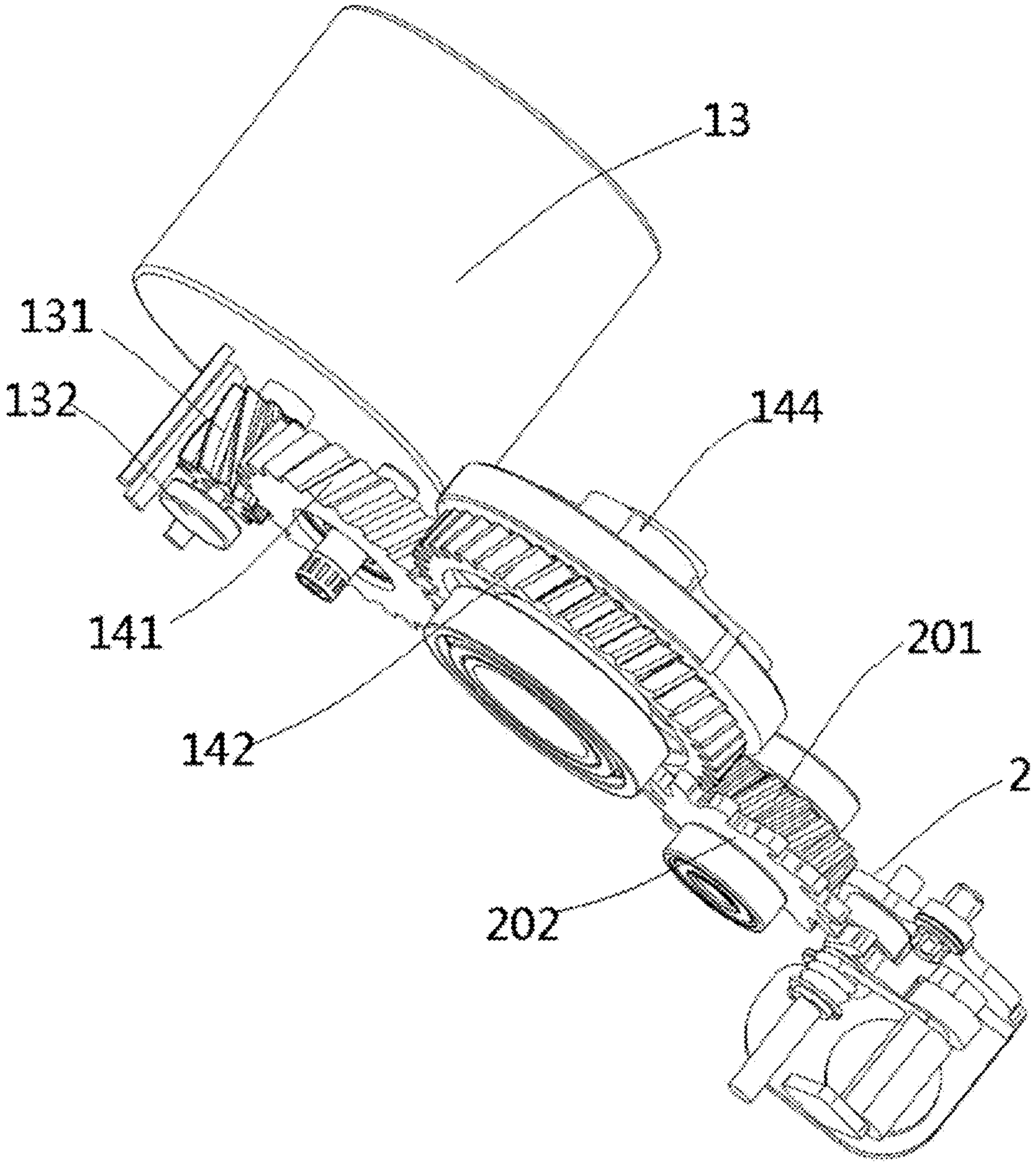
FIGS. 4 and 5 illustrate the internal structure of the electromechanical brake according to the examples of the present disclosure from different angles.
Figure 5:
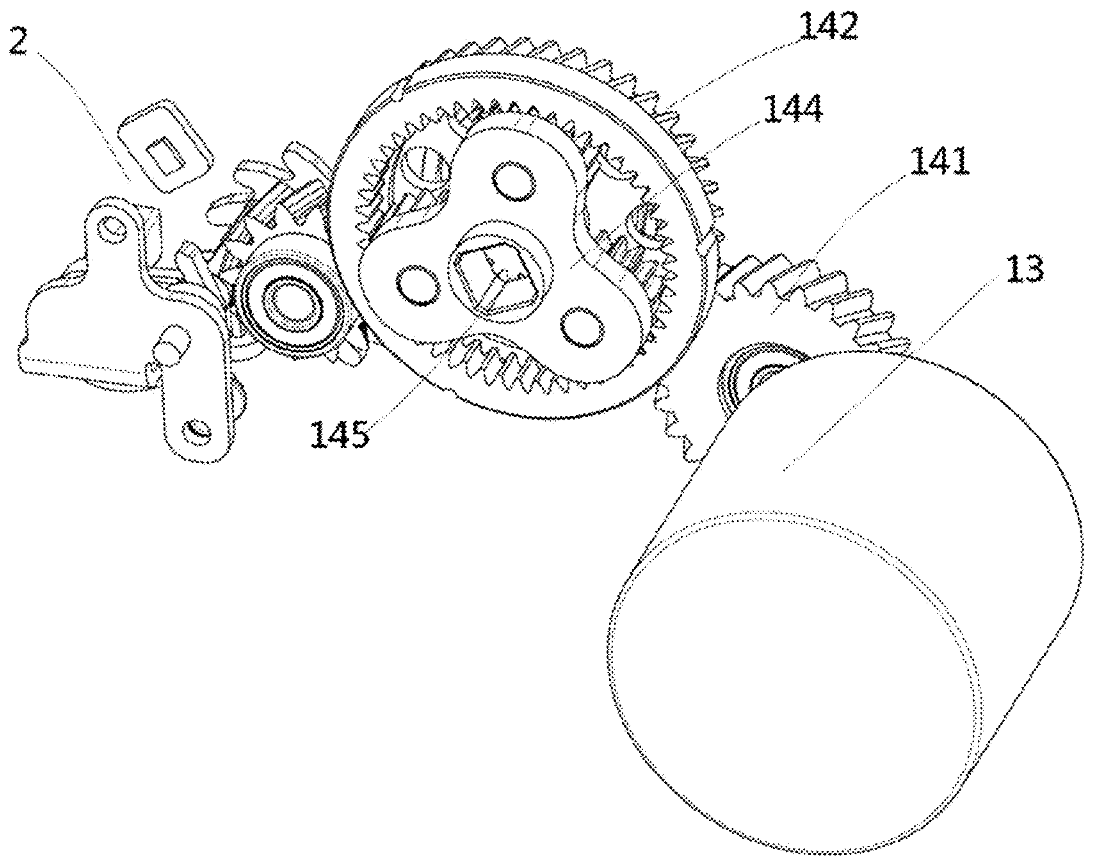
Figure 6:
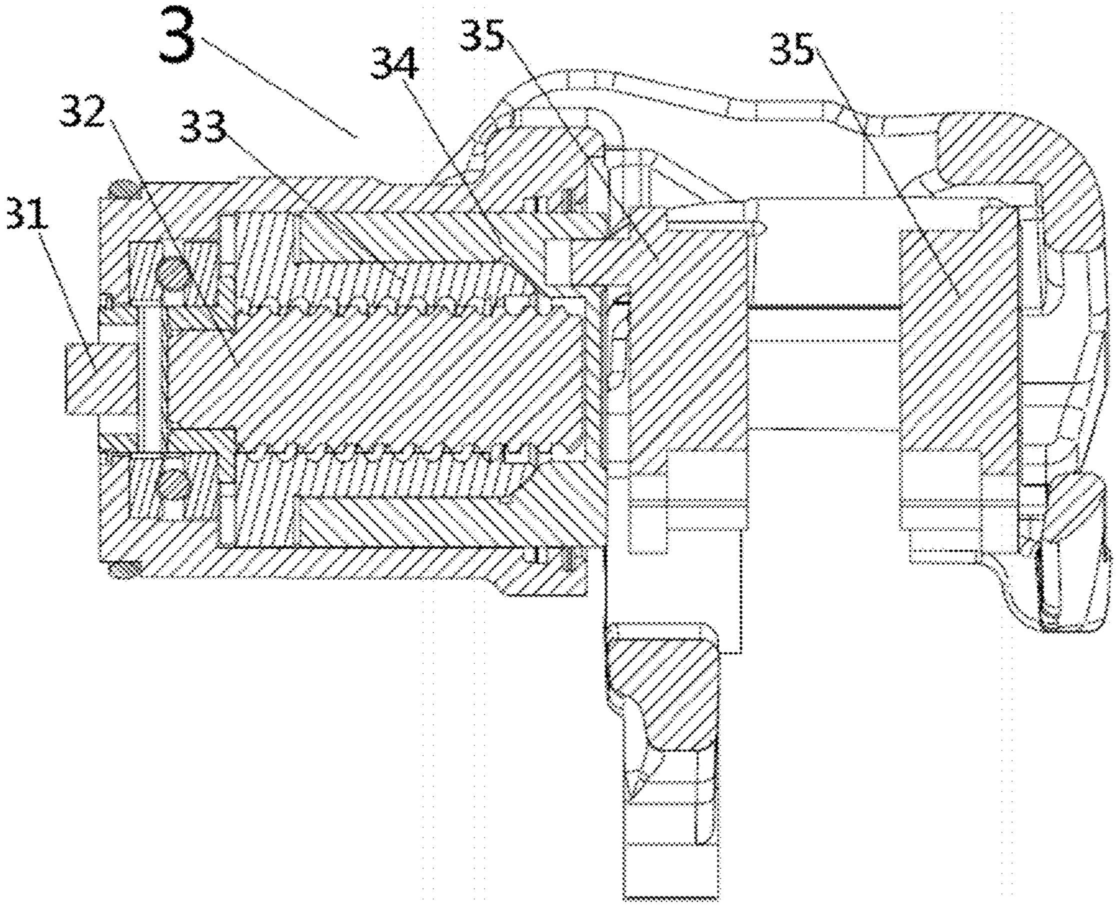
FIG. 6 is a cross-sectional view of the brake actuator of the electromechanical brake according to the examples of the present disclosure.
Figure 7:
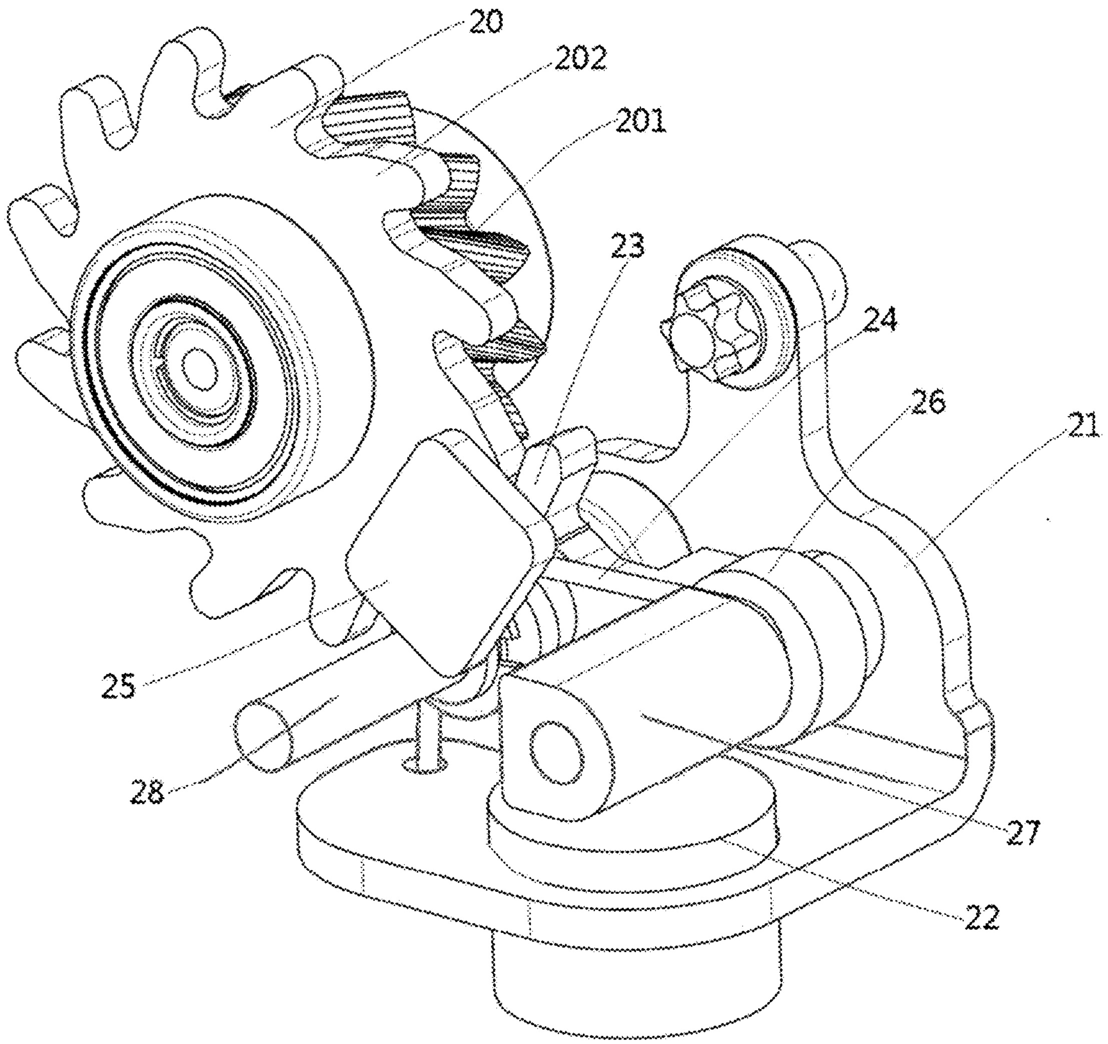
FIG. 7 is a perspective view of the locking device of the electromechanical brake in an idle state according to the examples of the present disclosure.
Figure 8:
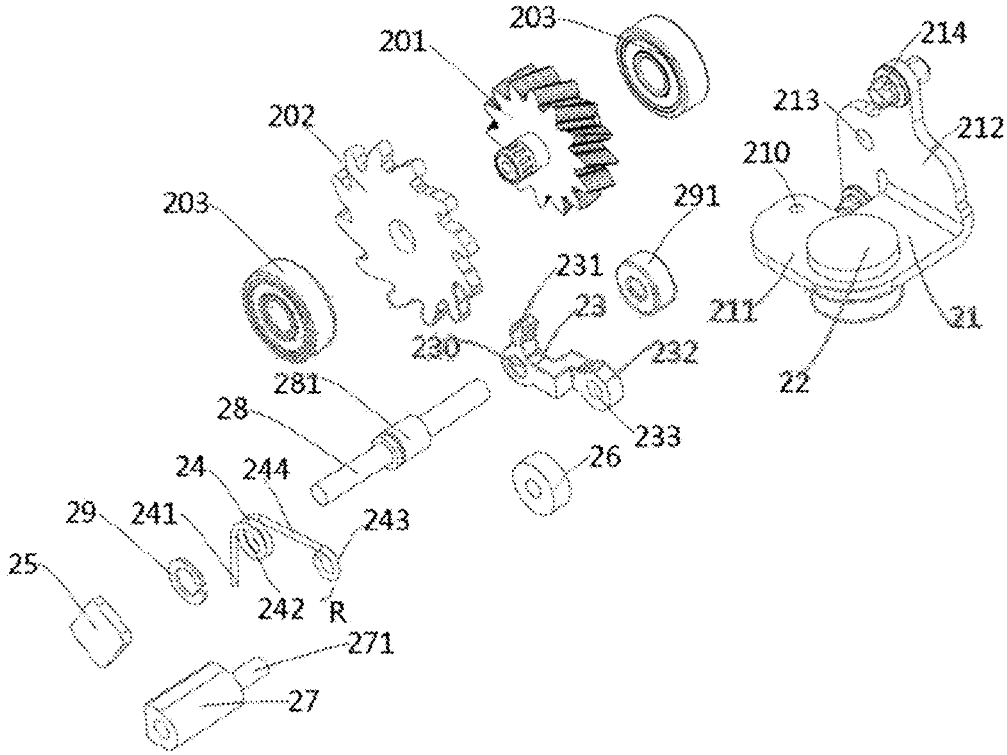
FIG. 8 is an exploded view of the locking device of the electromechanical brake according to the examples of the present disclosure.
Figure 9:
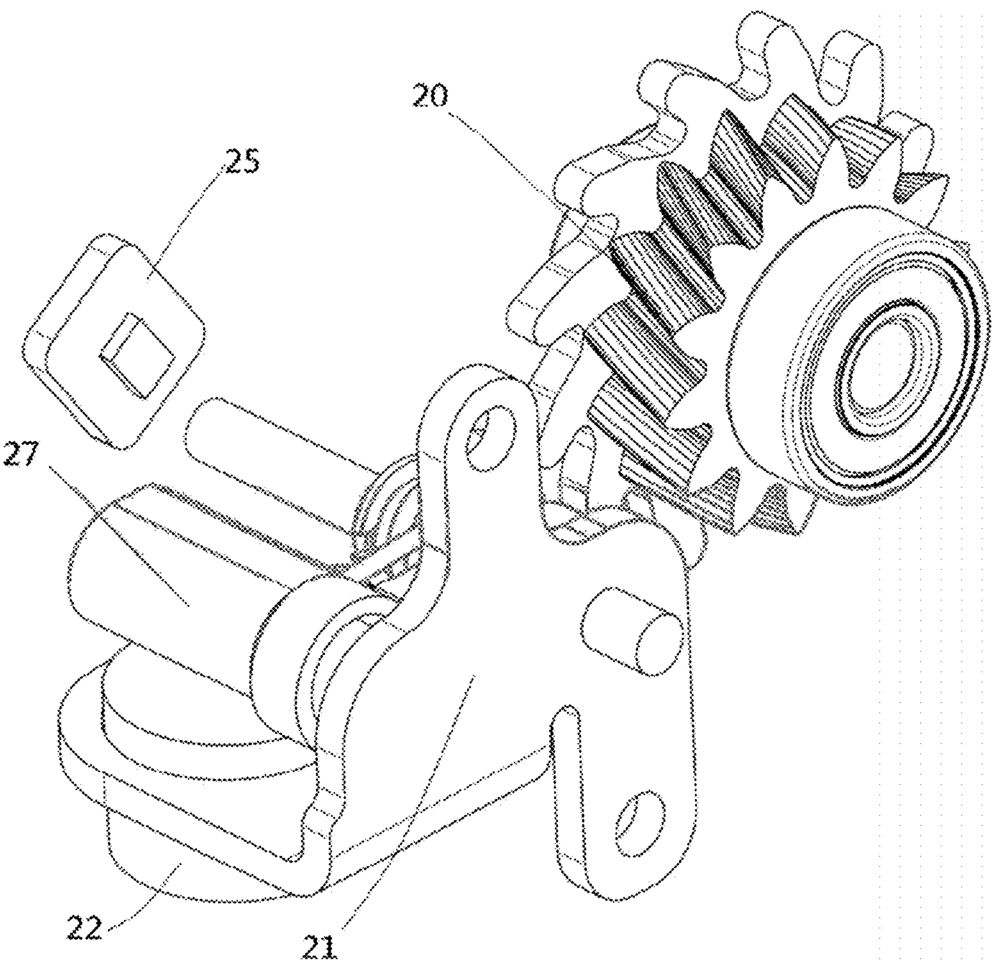
FIGS. 9 and 10 are perspective views of the locking device of the electromechanical brake in an idle state according to the examples of the present disclosure from different angles.
Figure 10:
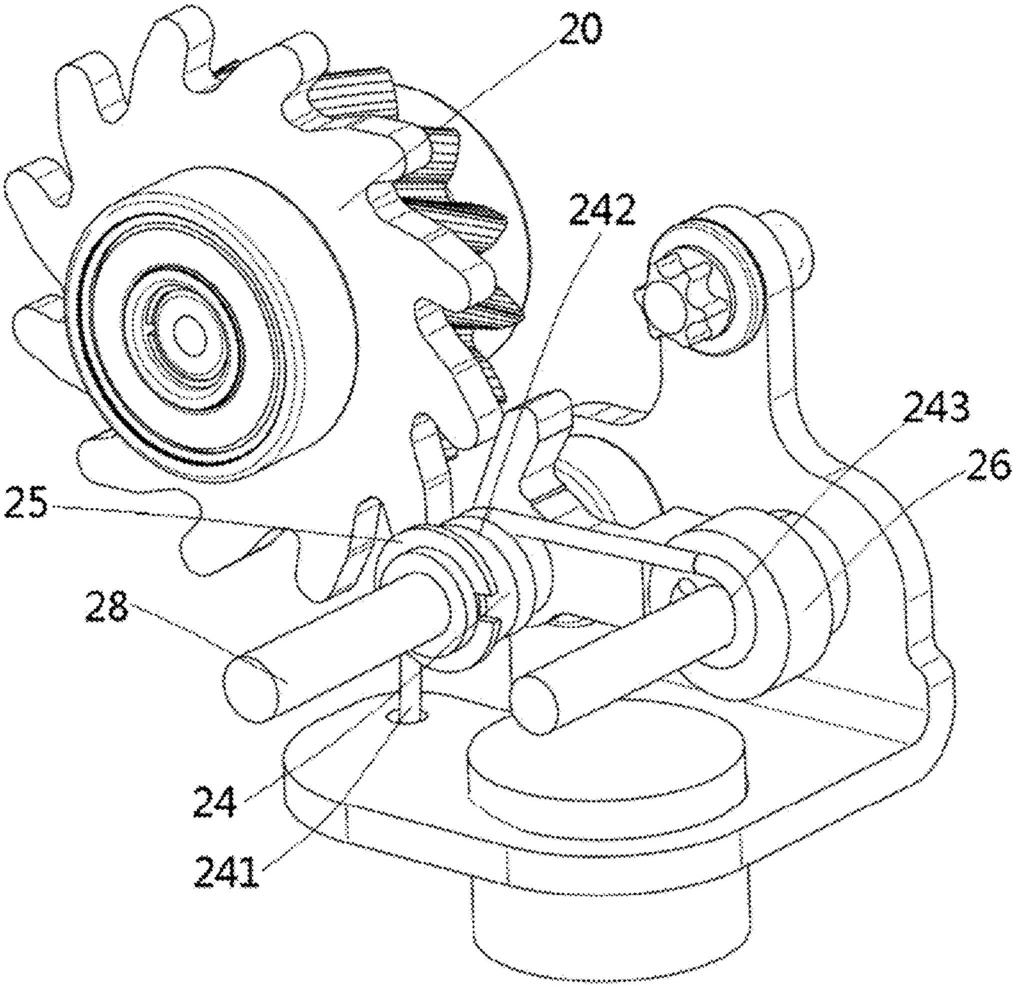
Figure 11:
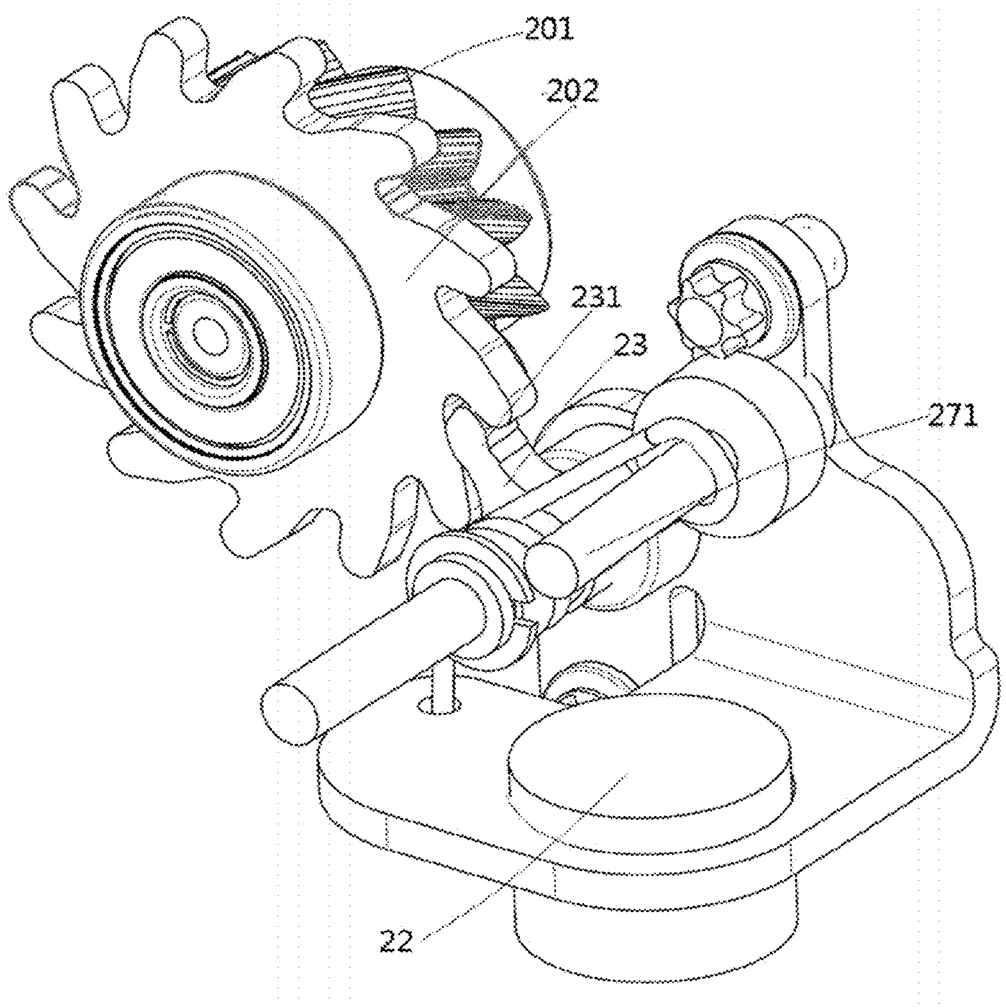
FIG. 11 is a perspective view of the locking device of the electromechanical brake in a working state according to the examples of the present disclosure.

The electromechanical brake 100 according to the examples of the present disclosure comprises a brake motor 13, a transmission device 14 coupled to the brake motor 13, a locking device 2, and a brake actuator 3 (FIG. 6). Referring to FIGS. 2-5, the electromechanical brake 100 with the exception of brake actuator 3 is introduced. The brake motor 13 provides braking torque and its output shaft is connected to a pinion 131. In addition, a first sensor 132 is connected to the output shaft of the brake motor 13 to sense the state of the brake motor 13, such as the speed and phase. The brake motor 13 passes through the first housing 12 into an interior space enclosed by the first housing 12 and the second housing 11 in which a transmission device 14 and a locking device 2 are also arranged, the transmission device 14 connecting between the brake motor 13 and the brake actuator 3 for delivering the rotational torque of the brake motor 13 to the brake actuator 3 and for reducing the speed and increasing the torque. The locking device 2 provides the parking brake to prevent conditions such as parking slippage. More specifically, the pinion 131 on the output shaft of the brake motor 13 is engaged with the hub gear 142 via an intermediate gear 141, and the hub gear 142 passes through a planetary gear set to output the torque by the planetary carrier 144 of the planetary gear set. The planetary carrier 144 has a profiled shaft bore 145 to be coupled with the input shaft 31 of the brake actuator 3 in FIG. 6 for delivering the torque to the brake actuator 3. In another aspect, the locking device 2 comprises a ratchet assembly 20 comprising a ratchet gear 201 and a ratchet wheel 202 fixedly coupled in a coaxial manner, wherein the ratchet gear 201 is also engaged with the hub gear 142. Referring to FIG. 3, the transmission device 14 and the locking device 2 are generally herringbone-shaped and are thus housed in the herringbone-shaped housing. It should be understood that although the specific configuration of the transmission device is shown in the drawings, other configurations of the transmission device may also be used in alternative examples. Furthermore, although the locking device 2 and the hub gear 142 of the transmission device are engaged as shown in the drawings, in alternative examples, the locking device 2 may engage any of the gears on the main drive chain of the transmission device, or may engage the transmission device via other gears.

Referring further to FIG. 6, a cross-sectional view of the brake actuator 3 is shown. As previously mentioned, the input shaft 31 of the brake actuator 3 is coupled to the shaft bore 145 of the planetary carrier 144 of the transmission device 14 to receive torque, and the input shaft 31 is coupled to a lead screw 32 or integrally formed, and the rotational torque of the input shaft 31 is converted by the coupling of the lead screw 32 and the nut 33 in the ball screw device into the axial displacement of the nut 33. Then, the nut 33 pushes the plunger 34 axially to drive a pair of friction plates 35 on the floating brake actuator 3 to grip the brake disc 95 (not shown) therebetween, thereby generating a braking force by contacting the friction plates 35 with the brake disc 95.

Next, the specific configuration of the locking device 2 according to the examples of the present disclosure will be described in conjunction with FIGS. 7-11. The locking device 2 according to the examples of the present disclosure comprises a ratchet gear 201 and a ratchet wheel 202 fixedly coupled in a coaxial manner, both having coaxial rotation axis and fixedly coupled to rotate together, wherein a ratchet assembly 20 consisting of the ratchet gear 201 and the ratchet wheel 202 is supported by a pair of bearings 203; a pivotable pawl component 23 capable of pivotable movement between a working position (shown in FIG. 11) interlocked with the ratchet wheel 202 and an idle position (shown in FIG. 10) separated from the ratchet wheel 202, wherein the pawl component 23 prevents the rotation of the ratchet wheel 202 in the first direction (clockwise in FIG. 11) and the rotation of the ratchet gear 201 in the second direction (counterclockwise in FIG. 11) releases the pawl component 23 when the pawl component 23 and the ratchet wheel 202 are interlocked; a spring member 24 that tends to rotate the pawl component 23 toward the idle position; and an electromagnetic actuator 22 that acts on the pawl component 23 when energized to rotate the pawl component 23 from the idle position to the working position. When the ratchet gear 201 in the ratchet assembly 20 and the brake motor 13 are engaged with the hub gear 142 of the transmission device 14, the rotation of the ratchet gear 201 and the ratchet wheel 202 in the first direction corresponds to the reverse rotation of the brake motor 13 and the transmission device 14, i.e., rotating in the direction of releasing the brake torque, while the rotation of the ratchet gear 201 and the ratchet wheel 202 in the second direction corresponds to the forward rotation of the brake motor 13 and the transmission device 14, i.e., rotating in the direction of increasing the brake torque. Therefore, the pawl component 23 in the working position prevents the rotation of the ratchet wheel 202 in the first direction, thereby preventing the reverse rotation of the brake motor 13 and the transmission device 14 to release the brake torque, maintaining the brake torque and achieving the parking brake.

In some examples of the present disclosure, the locking device 2 comprises a base 21 to which the pawl component 23 is pivotally fixed by a pivot shaft 28 and to which the electromagnetic actuator 22 is also fixed. In some examples of the present disclosure, the base 21 is formed by bending a metallic material and comprises a first plane 211 and a second plane 212 perpendicular to each other. An electromagnetic actuator 22 is mounted in an opening on the first plane 211 of the base. In addition, an additional opening 210 is provided on the first plane 211 of the base for mounting the spring member 24, while a mounting hole 213 is provided on the second plane 212 of the base 21 for receiving the pivot shaft 28. Moreover, a plurality of bolt holes are provided on the second plane 212 of the base 21 for fixing the base 21 and its components through the bolt 214.

In some examples of the present disclosure, the pawl component 23 comprises a shaft bore 230 coupled to a pivot shaft 28 from which a pawl portion 231 protrudes from the shaft bore 230 in the first direction to engage with the ratchet wheel 202, a rocker arm 232 and a magnet 27 at the end of the rocker arm 232 extending from the shaft bore 230 in the second direction, wherein the electromagnetic actuator acts on the magnet 27 at the end of the rocker arm 232. More specifically, the pivot shaft 28 passes through the shaft bore 230 of the pawl component 23 and through the washer 291 to be received by the mounting bore 213 on the second plane 212 of the base 21. The pivot shaft 28 has a boss portion 281 wherein the pawl component 23 is positioned between the boss portion 281 and the washer 291. In some examples of the present disclosure, a mounting hole 233 is provided at the end of the rocker arm 232 of the pawl component 23, and the magnet 27 is mounted to the mounting hole 233 by a pin 271. When installed in place, the magnet 27 is positioned above and adjacent to the electromagnetic actuator 22 in the idle position.

In some examples of the present disclosure, the spring member 24 is a coiled spring comprising a first end 241, a coiled portion 242, a second end 244 and a mounting hook 243 at the end of the second end 244. The first end 241 of the spring member 24 is mounted to the additional opening 210 on the first surface 211 of the base, and the coiled portion 242 surrounds the boss portion 281 of the pivot shaft 28 and is defined by a snap ring 29; the second end 244 of the spring member 24 is fixed to the pawl component 23 by a mounting hook 243 at the end, such as the mounting hook 243 mounted on the pin 271 of the magnet 27 at the end of the rocker arm 232 of the pawl component 23. In some examples of the present disclosure, the spring member 24 is prestressed, i.e., in the idle state shown in FIG. 8; if its second end 244 is released, the second end 244 will rotate in the direction of the arrow R to approach the first end 241 such that the spring member 24 in the idle position exerts a precompression to the pawl component 23 to keep it in the idle position. In some examples of the present disclosure, the locking device 2 further comprises a buffer 26 disposed at the end of the rocker arm, wherein the buffer 26 is, for example, a bushing made of rubber, designed to firstly contact with the base when the pawl component 23 moves from the working position to the idle position, thereby preventing or at least relieving the magnet 27 at the end of the pawl component 23 from colliding with the electromagnetic actuator 22. In some examples of the present disclosure, the locking device 2 further comprises a position sensor 25 that detects the position of the pawl component 23, wherein the position sensor 25 detects the position of the pawl component 23 by sensing the magnetic field of the magnet 27 at the end of the rocker arm, For example, the position sensor 25 may be disposed on one side of the magnet 27 of the pawl component 23 in the working position, whereby the position sensor 25 will sense an increase in the magnetic field of the magnet 27 when the pawl component 23 is in the working position, thereby determining that the pawl component 23 is in the working position and that the pawl component 23 returns to the idle position when the magnetic field decreases to an initial value near the idle position.

Figure 12:
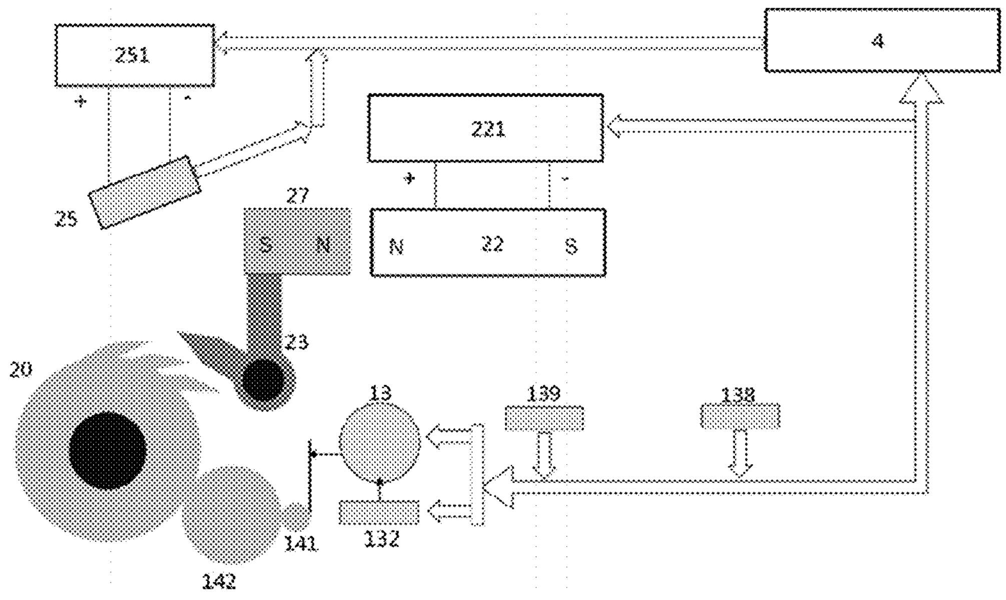
FIGS. 12-15 are schematic diagrams of a control structure of the electromechanical brake according to the examples of the present disclosure.

Next, referring further to FIGS. 12-15, the operating modes of the electromechanical brake according to the examples of the present disclosure under operating conditions such as parking brake and parking brake release are described. FIG. 12 shows a controller 4, such as a vehicle ECU, which is connected to a power supply 251 of the position sensor 25 to control the supply of power to the position sensor 25 and to receive the feedback signal of the position sensor 25; the controller 4 is further coupled to the power supply 221 of the electromagnetic actuator 22 to control the supply of power to the electromagnetic actuator 22. In addition, the controller 4 is further connected to the brake motor 13 to control the operation of the brake motor 13 and to the first sensor 132 on the output shaft 131 of the brake motor 13 to receive its feedback on the state of the brake motor 13; furthermore, the controller 4 may also comprise an output torque sensor 139 of the electromechanical brake connected to a current sensor 138 for receiving the actually outputted brake torque. Also, the pawl component 23 and the magnet 27, the ratchet assembly 20, the hub gear 142, and the intermediate gear 141 thereon are shown, which are connected as described above in connection with FIGS. 1-11.

During normal driving, the locking device 2 may be inoperative, and its ratchet assembly 20 will rotate with the hub gear 142; the controller 4 controls the brake motor 13 to output brake torque based on brake pedal displacement. In this state, in some examples of the present disclosure, the power supply 251 of the position sensor 25 and the power supply 221 of the electromagnetic actuator 22 may even be turned off.

Figure 13:
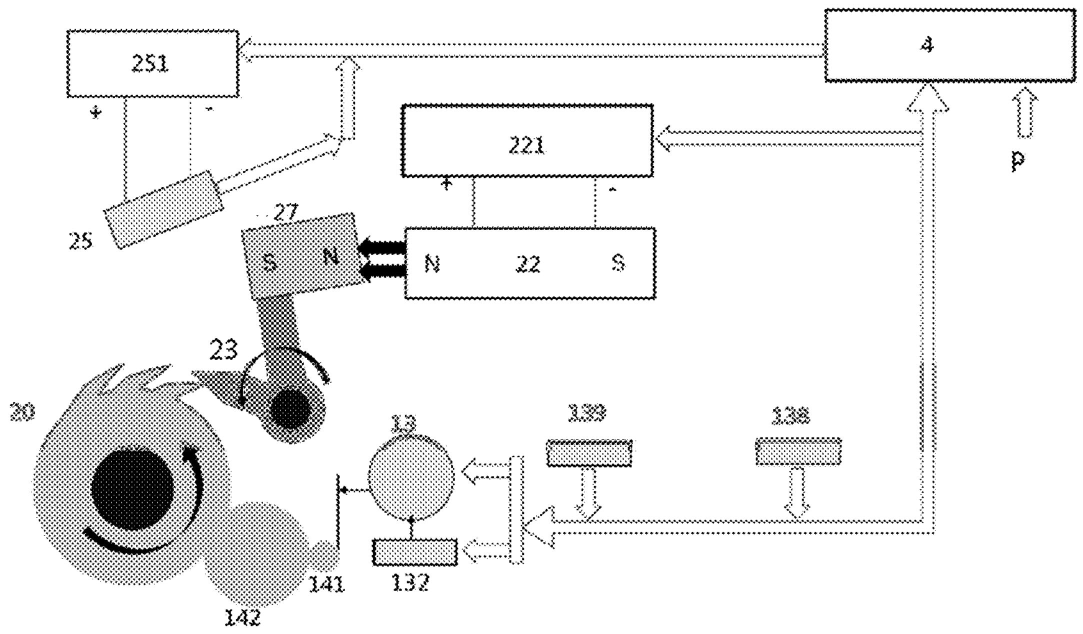
Figure 14:
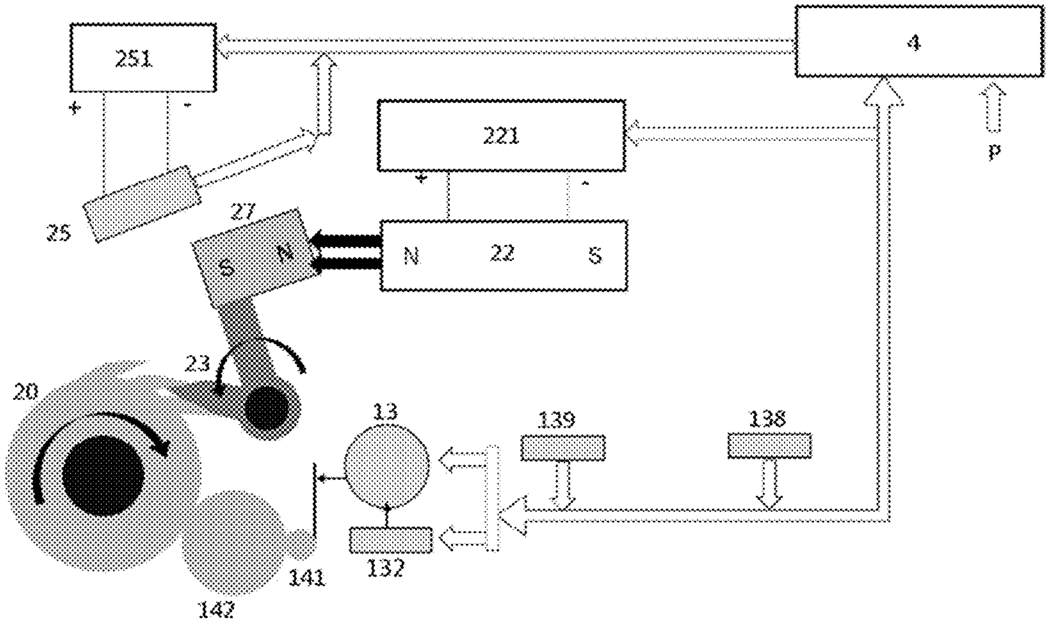

Referring further to FIGS. 1-11 and 13, after, for example, the electronic handbrake is pressed after the passenger parks the vehicle, the controller 4 receives a parking brake signal P which controls the brake motor 13 to rotate forward to establish a predetermined braking torque. Upon receiving a feedback signal from the output torque sensor 139 that the predetermined braking torque has been established, the controller 4 may activate the power supply 221 of the electromagnetic actuator 22 and supplies power to the electromagnetic actuator 22 that acts on the pawl component 23 and, more specifically, on the magnet 27 thereon, wherein the magnet overcomes the retaining force of the spring member 24 to pivot the pawl component 23 from an idle position separated from the ratchet wheel to a working position. At this time or at any point after receiving the parking brake signal P, the controller 4 may control the power supply 251 of the position sensor 25 to supply power to the position sensor 25 for detecting the position of the pawl component 23. The pawl component 23 may pivot to a position close to its working position as shown in FIG. 13. Subsequently, as shown in FIG. 14, the controller 4 controls the brake motor 13 to rotate reversely such that the pawl component 23 interlocks with the ratchet wheel of the ratchet assembly 20, at which point the pawl component 23 fully reaches its working location. It should be understood that the angle of reverse rotation of the motor 13 is less than one pitch of the corresponding ratchet wheel, but this reverse rotation will result in a decrease in the brake torque. Therefore, this reverse rotation should be taken into account when setting the predetermined braking torque. For example, the predetermined brake torque should be at least the sum of the brake torque required for the parking brake and the torque corresponding to an additional pitch of rotation of the ratchet wheel, or may be set to be greater, e.g., increasing the torque corresponding to an additional two or more pitches of rotation of the ratchet wheel, thereby avoiding the decreased parking brake torque due to the reverse rotation of the brake motor. Subsequently, for example, when the position sensor 25 detects that the pawl component 23 is in the working position, the electromagnetic actuator 22 and the brake motor 13 can be stopped. It can thus be seen that according to the examples of the present disclosure, the locking device 2 only needs to supply power to the electromagnetic actuator 22 for a short period of time when the parking brake is implemented, so as to avoid long-term power supply to the electromagnetic actuator 22 during parking, and avoid parking brake failure caused by a faulty electromagnetic actuator 22.

In some examples of the present disclosure, the controller 4 only needs to control the brake motor 13 to rotate forward when the parking brake signal is received, such that rotation may correspond, for example, to a pitch of the pawl, which will cause the ratchet assembly 20 to rotate in a direction opposite to the direction shown in FIG. 14, thereby releasing the pawl component 23 and returning it to the idle position under the action of the spring member; subsequently, the brake motor is then controlled to rotate reversely for releasing the braking force. In some examples of the present disclosure, the controller 4 may control the electromagnetic actuator 22 to act on the pawl component 23 during the return of the pawl component to the idle position under the action of the spring member to provide a buffer, at which point the current of the electromagnetic actuator 22 can be controlled to be relatively small to reduce the force.

Figure 15:
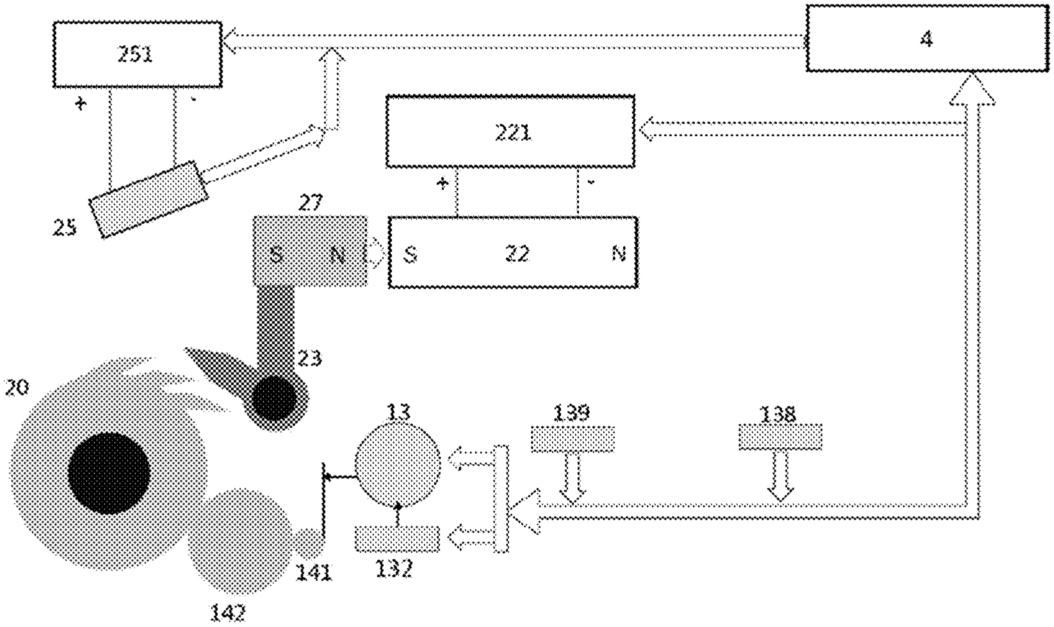

In addition, the pawl component 23 may deviate from the idle position due to the vibration of the vehicle during driving. In order to avoid this situation, in some examples of the present disclosure, as shown in FIG. 15, the controller 4 may be configured to control the electromagnetic actuator 22 to act on the pawl component 23 with a second polarity opposite the first polarity for exerting an attractive force on the magnet 27 on the pawl component 23 such that the pawl component 23 remains in the idle position, when no parking brake signal is received and the pawl component 23 is detected to leave the idle position.

The examples described above in the present disclosure are intended only to more clearly describe the principles of the present disclosure, wherein individual components are clearly shown or described to make the principles of the present disclosure easier to understand. Various modifications or variations may be readily made to the present disclosure by those skilled in the art without departing from the scope of the present disclosure. Therefore, it should be understood that such modifications or variations are covered by the patent protection of the present disclosure.

What is claimed is:

1. A locking device for an electromechanical brake, comprising:
- a ratchet gear and a ratchet wheel fixedly coupled in a coaxial manner;
- a pivotable pawl component pivotable between a working position interlocked with the ratchet wheel and an idle position detached from the ratchet wheel, wherein the pawl component restricts rotation of the ratchet wheel in a first direction and the ratchet wheel rotating in a second direction will release the pawl component when the pawl component and the ratchet wheel are interlocked;
- a spring member coupled to the pawl component to tend to rotate the pawl component toward the idle position; and
- an electromagnetic actuator acting on the pawl component when operating in a first polarity causes the pawl component to rotate from the idle position to the working position against the elastic force of the spring member.

2. The locking device according to claim 1, further comprising a base defining a first plane and a second plane, the electromagnetic actuator being fixed to the first plane of the base, and the pawl component being pivotally fixed to the second plane of the base by a pivot shaft.

3. The locking device according to claim 1, wherein:
- the pawl component comprises a shaft bore connected to the pivot shaft, a pawl portion extending from the shaft bore in a first direction, a rocker arm extending from the shaft bore in a second direction, and a magnet at the end of the rocker arm,
- the magnet is connected to the end of the rocker arm by a pin, and
- the electromagnetic actuator is configured to act on the magnet at the end of the rocker arm.

4. The locking device according to claim 3, further comprising:
- a position sensor configured to detect the position of the pawl component, the position sensor being configured to detect the position of the pawl component by sensing a magnetic field of the magnet at the end of the rocker arm.

5. The locking device according to claim 3, further comprising a buffer disposed at the end of the rocker arm.

6. The locking device according to claim 3, wherein the spring member comprises a first end, a winding portion and a second end, the first end of the spring member being mounted to an additional opening in the first plane of the base of the locking device, the winding portion surrounding the pivot shaft, the second end of the spring member being fixed to the end of the rocker arm of the pawl component, the spring member being preloaded with an elastic force such that the spring member exerts a force to hold the pawl component in the idle position when the pawl component is in the idle position.

7. The locking device according to claim 1, wherein the electromagnetic actuator is further configured to operate with a second polarity to exert a force to the pawl component for holding it in the idle position.

8. An electromechanical brake, comprising:
- a brake motor;
- a transmission device coupled with the brake motor;
- the locking device according to claim 1, wherein the ratchet gear of the locking device is coupled to the transmission device; and
- a brake actuator coupled to the transmission device to receive a brake torque and perform a brake operation.

9. The electromechanical brake according to claim 8, wherein the brake motor and the ratchet gear of the locking device are coupled to a hub gear of the transmission device such that the rotation of the ratchet gear and the ratchet wheel in the first direction corresponds to the reverse rotation of the releasing brake torque of the brake motor and the transmission device, while the rotation of the ratchet gear and the ratchet wheel in the second direction corresponds to the forward rotation of the establishing brake torque of the braking motor and the transmission device, wherein the hub gear is connected to the input shaft of the brake actuator by a planetary carrier of a planetary gear set.

10. A control method for a locking device, comprising:
- controlling the brake motor to rotate forwardly to establish a predetermined braking torque when the parking brake signal is received;
- controlling the electromagnetic actuator to act on the pawl component to pivot the pawl component from an idle position separated from the ratchet wheel to a working position;
- controlling the reverse rotation of the brake motor to pivot the pawl component to the working position to interlock with the ratchet wheel, and
- deactivating the electromagnetic actuator and the brake motor.

11. The control method according to claim 10, further comprising detecting the position of the pawl component by a position sensor and deactivating the electromagnetic actuator and the brake motor when the pawl component is in the working position.

12. The control method according to claim 10, further comprising:
- controlling the brake motor to rotate forwardly to release the pawl component upon receiving the released parking brake signal such that the pawl component returns to the idle position under the action of a spring member; and
- controlling the reverse rotation of the brake motor to release the braking force upon detecting the return of the pawl component to the idle position.

13. The control method according to claim 12, further comprising controlling the electromagnetic actuator to act on the pawl component with a first polarity to provide buffering when the pawl component rotates from the working position to the idle position under the action of the spring member.

14. The control method according to claim 10, further comprising controlling the electromagnetic actuator to act on the pawl component with a second polarity opposite to the first polarity to maintain the pawl component in the idle position when no parking brake signal is received and the pawl component is detected to leave the idle position.

* * * * *